United States Patent
Hirose

(10) Patent No.: US 9,188,966 B2
(45) Date of Patent: Nov. 17, 2015

(54) HOST CONTROLLER GENERATING POSITION CONTROL GAIN

(71) Applicant: FANUC CORPORATION, Minamitsuru-gun, Yamanashi (JP)

(72) Inventor: Noboru Hirose, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 23 days.

(21) Appl. No.: 14/229,607

(22) Filed: Mar. 28, 2014

(65) Prior Publication Data

US 2014/0292250 A1    Oct. 2, 2014

(30) Foreign Application Priority Data

Mar. 28, 2013 (JP) .................. 2013-070163

(51) Int. Cl.
    *G05B 5/01*      (2006.01)
    *G05B 11/01*     (2006.01)
    *G05B 19/19*     (2006.01)

(52) U.S. Cl.
    CPC ............... *G05B 11/01* (2013.01); *G05B 19/19* (2013.01); *G05B 2219/41021* (2013.01); *G05B 2219/41026* (2013.01)

(58) Field of Classification Search
CPC ..................... G05B 19/19; G05B 2219/41021; G05B 2219/41026
USPC ................................................. 318/619, 609
See application file for complete search history.

(56) References Cited

U.S. PATENT DOCUMENTS

2004/0000890 A1    1/2004   Genma et al.

FOREIGN PATENT DOCUMENTS

| JP | 62224802 A | 10/1987 |
| JP | 2001216008 A | 8/2001 |
| JP | 2004-030500 A | 1/2004 |
| JP | 2009175946 A | 8/2009 |

*Primary Examiner* — Erick Glass
(74) *Attorney, Agent, or Firm* — Hauptman Ham, LLP

(57) ABSTRACT

A reference value generating unit (14b) generates a reference value which is equal to a speed command value taken when an override value is 1. A speed command value generating unit (14c) generates a speed command value taken when an override value is a set value. A position control gain generating unit (14d) generates a position control gain to be used by a motor controller (12) on the basis of the ratio of the speed command value to the reference value and a gain-related value relating to a gain which is set in accordance with an upper die (9a), and outputs the generated position control gain to a memory (11).

4 Claims, 6 Drawing Sheets

FIG. 2

| ROTATION ANGLE OF MAIN GEAR | GAIN MULTIPLIER | MINIMUM SPEED COMMAND VALUE | MAXIMUM SPEED COMMAND VALUE |
|---|---|---|---|
| P1 | α1 | Fmin1 | Fmax1 |
| P2 | α2 | Fmin2 | Fmax2 |
| P3 | α3 | Fmin3 | Fmax3 |
| P4 | α4 | Fmin4 | Fmax4 |
| P5 | α5 | Fmin5 | Fmax5 |
| P6 | α6 | Fmin6 | Fmax6 |
| P7 | α7 | Fmin7 | Fmax7 |
| P8 | α8 | Fmin8 | Fmax8 |
| P9 | α9 | Fmin9 | Fmax9 |

FIG. 4

| ROTATION ANGLE OF MAIN GEAR | GAIN | MINIMUM SPEED COMMAND VALUE | MAXIMUM SPEED COMMAND VALUE |
|---|---|---|---|
| P1 | G1 | Fmin1 | Fmax1 |
| P2 | G2 | Fmin2 | Fmax2 |
| P3 | G3 | Fmin3 | Fmax3 |
| P4 | G4 | Fmin4 | Fmax4 |
| P5 | G5 | Fmin5 | Fmax5 |
| P6 | G6 | Fmin6 | Fmax6 |
| P7 | G7 | Fmin7 | Fmax7 |
| P8 | G8 | Fmin8 | Fmax8 |
| P9 | G9 | Fmin9 | Fmax9 |

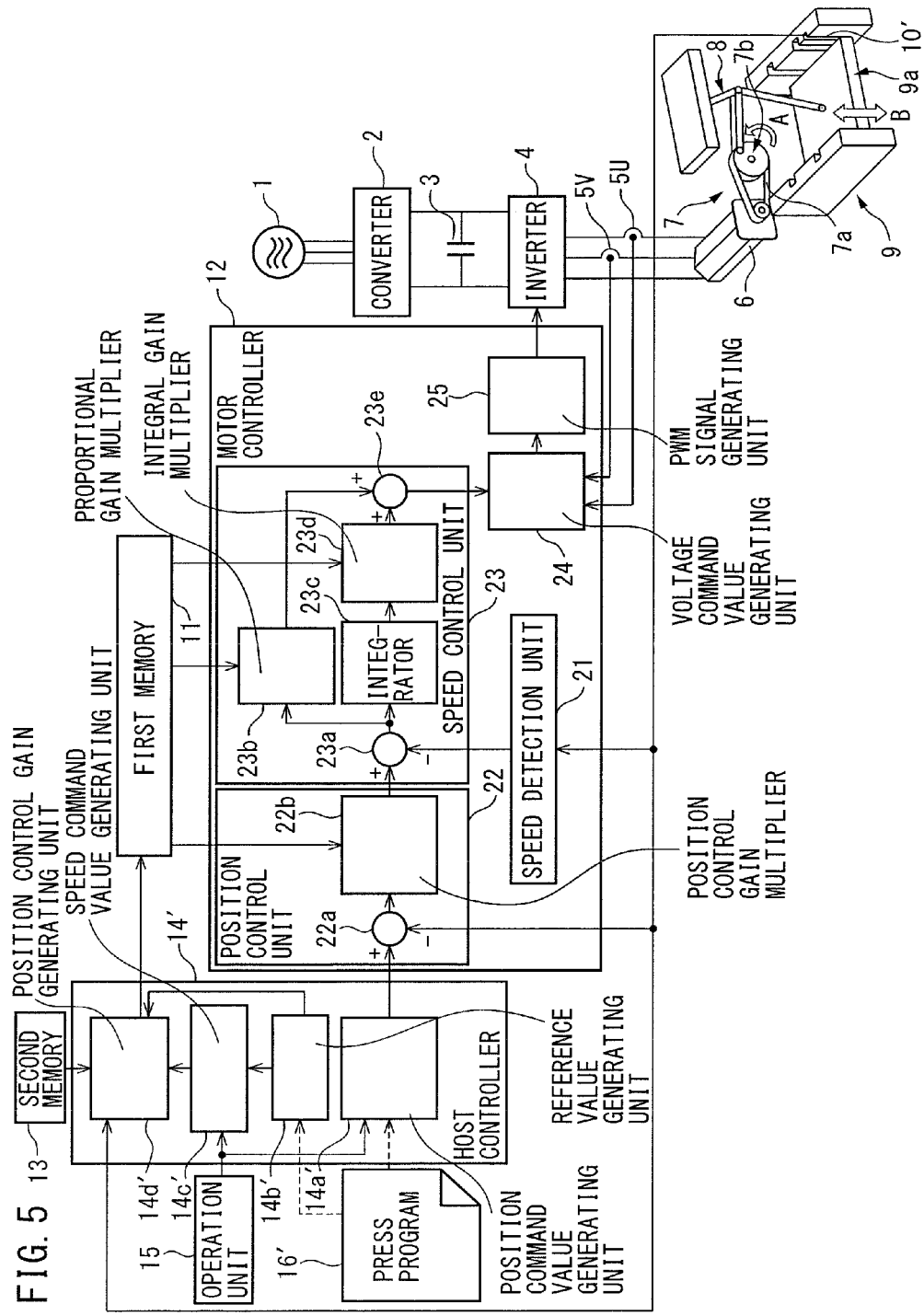

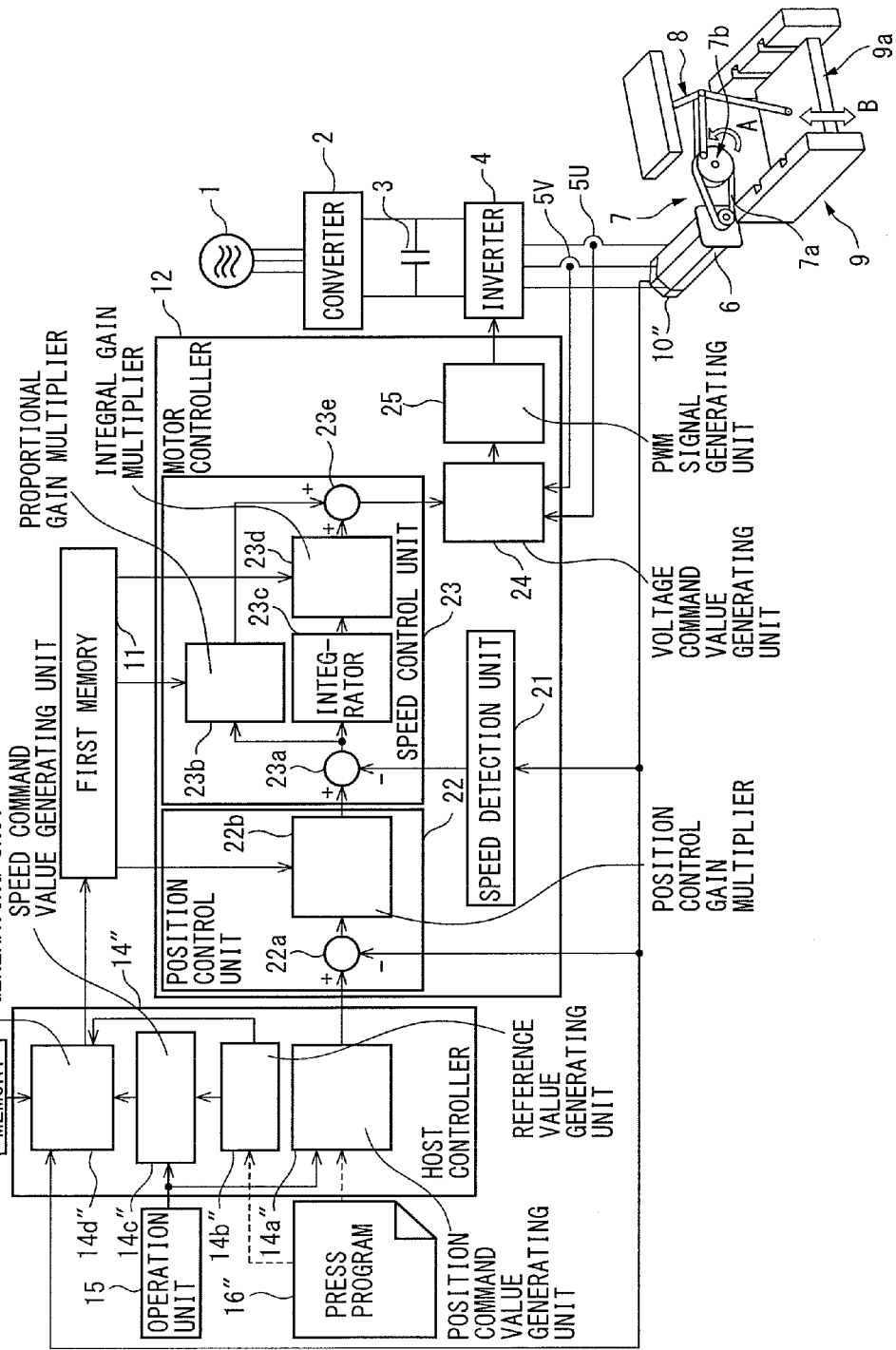

HOST CONTROLLER GENERATING POSITION CONTROL GAIN

CROSS-REFERENCE TO RELATED APPLICATIONS

This application is a new U.S. patent application that claims benefit of JP 2013-070163, filed on Mar. 28, 2013, the content of JP 2013-070163 is incorporated herein by reference.

FIELD OF THE INVENTION

The present invention relates to a host controller outputting a position command value relating to the position of a motor to a motor controller controlling the motor in order to control the motor controller.

BACKGROUND OF THE INVENTION

A motor controller which controls feedback control for a motor is used for causing the motor to drive a driven object. For that purpose, the motor controller generates a speed command value for the motor on the basis of an error between a position command value for the motor and the actual position (for example, the rotation angle) of the motor, and a position control gain.

The position command value for the motor is input from a host controller into the motor controller. The host controller generates the position command value for the motor by analyzing data included in an operation process program (for example, a press program) for a driven object driven by the motor to perform a predetermined operation. The host controller then outputs the generated position command value for the motor to the motor controller.

Conventionally, as a host controller that outputs a position command value for a motor to a motor controller, a host controller has been proposed that changes a parameter such as a position control gain based on the position of either the motor or the driven object driven by the motor in order to ensure the stability of control and the quickness of operations of the motor controller (for example, see Japanese Unexamined Patent Publication No. JP-A-2004-30500).

In some situations, the speed of the motor needs to be reduced in order to operationally check and adjust the driven object driven by the motor before the driven object performs a predetermined operation. In such a situation, an override for changing the speed of the motor (for example, reducing the speed of the motor below a programmed speed) is performed while the driven object is being driven by the motor. In order to override, the host controller causes the motor controller to generate a speed command value for the motor which is set according to an override value. For example, the host controller causes the motor controller to generate a speed command value for the motor that is equal to the product of a speed command value for the motor taken when the override value is 1 and an override value (for example, 0.5). To accomplish this, the host controller generates a motor speed command value for the motor taken when the override value is a set override value (for example, 0.5) on the basis of a position command value for the motor taken when the override value is 1 and the set override value. The host controller then outputs the generated position command value to the motor controller.

However, the override changes the position deviation between a position command value for the motor and the actual position of the motor, leading to a change in the motion trajectory of the driven object driven by the motor. The change in the motion trajectory can adversely affect the stability of control and the quickness of operation of the motor controller. In order to avoid the adverse effect of a change in the motion trajectory on the control stability and operation quickness of the motor controller, the motor controller needs to be controlled so as to keep the motion trajectory of the driven object driven by the motor constant, irrespective of a change in the override value.

An object of the present invention is to provide a host controller capable of controlling a motor controller so as to keep the motion trajectory of a driven object driven by a motor constant, irrespective of a change in an override value.

SUMMARY OF THE INVENTION

A host controller according to the present invention is a host controller outputting a position command value relating to a position of a motor to a motor controller controlling the motor in order to control the motor controller. The host controller includes: a reference value generating unit analyzing data in a program that concerns a first speed command value relating to a speed of the motor taken when an override value is 1 to generate a reference value that is equal to the first speed command value or a second speed command value set based on the first speed command value; a speed command value generating unit obtaining the first speed command value and a set override value and generating, based on the first speed command value and the set override value, a third speed command value relating to a speed of the motor when the override value is the set value; and a position control gain generating unit taking an input of the reference value from the reference value generating unit and an input of the third speed command value from the speed command value generating unit, obtaining a gain-related value relating to a gain set in accordance with a driven object driven by the motor, generating, based on a ratio of the third speed command value to the reference value and the gain-related value, a position control gain used by the motor controller for generating the third speed command value, and outputting the generated position control gain.

Preferably, the position control gain generating unit takes an input of position information relating to a position of the motor and generates the position control gain based on the position information.

Preferably, when the third speed command value is smaller than a first set value set as a lower limit of the speed command value, the position control gain generating unit sets the third speed command value to the first set value, and when the third speed command value is greater than a second set value set as an upper limit of the speed command value, the position control gain generating unit sets the third speed command value to the second set value, the second set value being greater than the first set value.

According to the present invention, a motor controller can be controlled so as to keep the motion trajectory of a driven object driven by a motor constant, irrespective of a change in an override value.

DESCRIPTION OF THE DRAWINGS

These and other features and advantages of the present invention will be better understood by reading the following detailed description, taken together with the drawings wherein:

FIG. 2 is a diagram illustrating one example of a parameter table used by the host controller illustrated in FIG. 1;

FIG. 4 is a diagram illustrating a variation of the parameter table used by the host controller illustrated in FIG. 1;

FIG. 5 is a block diagram of a system including a host controller of a second embodiment of the present invention; and FIG. 6 is a block diagram of a system including a host controller of a third embodiment of the present invention.

DETAILED DESCRIPTION OF THE PREFERRED EMBODIMENTS

First Embodiment

Figure 1:
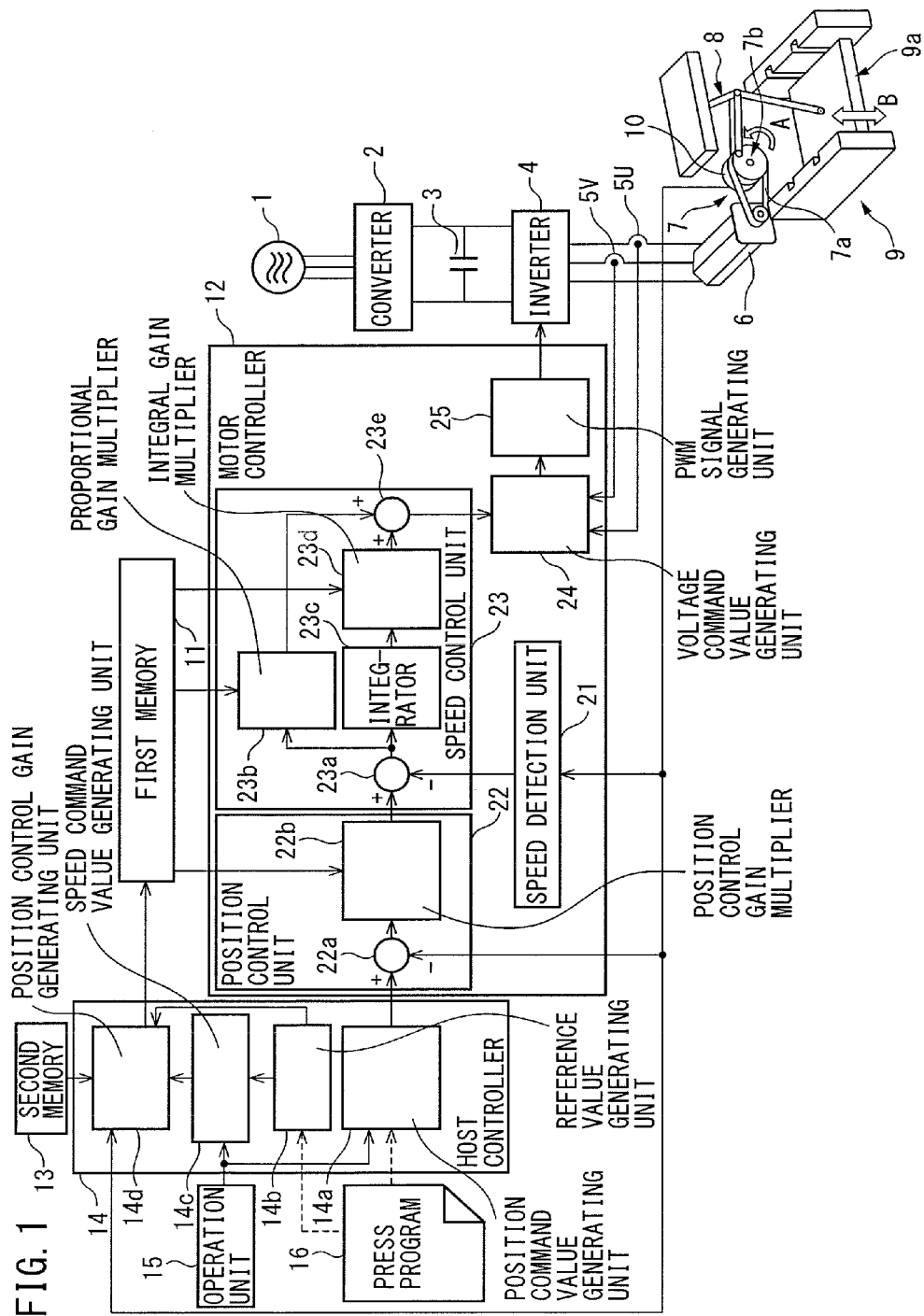
FIG. 1 is a block diagram of a system including a host controller of a first embodiment of the present invention.

Embodiments of a host controller according to the present invention will be described in detail with reference to drawings. Throughout the drawings, the same components are denoted by the same reference numerals.

FIG. 1 is a block diagram of a system including a host controller of a first embodiment of the present invention. The system illustrated in FIG. 1 includes a three-phase AC power source 1, a converter 2, a smoothing capacitor 3, an inverter 4, current sensing units 5U and 5V, a motor 6, a transmission mechanism 7, a link mechanism 8, an electrical press machine 9, a position detection unit 10, a first memory 11, a motor controller 12, a second memory 13, a host controller 14, and an operation unit 15.

The three-phase AC power source 1 may be a commercial AC power source. The converter 2 may include, for example, a plurality of (six in the case of three-phase AC) rectifying diodes and transistors each connected to corresponding rectifying diode in antiparallel and converts AC power supplied from the three-phase AC power source 1 to DC power. The smoothing capacitor 3 is connected to the converter 2 in parallel in order to smooth voltage rectified by the rectifying diodes of the converter 2. The inverter 4 is connected to the smoothing capacitor 3 in parallel and may include, for example, a plurality of (six in the case of three-phase AC) rectifying diodes and transistors each connected to corresponding rectifying diode in antiparallel. The inverter 4 converts DC power converted by the converter 2 to AC power by turning on and off the transistors on the basis of a PWM signal, which will be described later.

The current sensing units 5U and 5V are provided at output lines of the inverter 4 in order to detect two phases, namely U-phase current and V-phase current among the three phases, namely U-phase current, V-phase current, and W-phase current which flow through the motor 6. The current sensing units 5U and 5V in this embodiment may be implemented by hall elements, for example. The motor 6 is driven by power stored in the smoothing capacitor 3. The motor 6 in this embodiment is implemented by a motor such as a rotary servomotor in which permanent magnets are provided in either the rotor or the stator, a linear servomotor in which permanent magnets are provided in either the stator or the slider, an vibration servomotor in which permanent magnets are provided in either the stator or the vibrator.

The transmission mechanism 7 is connected to the rotary shaft of the motor 6. In this embodiment, the transmission mechanism 7 includes a rotary belt 7a and a main gear 7b. The link mechanism 8 is implemented by nonlinear elements connected to the main gear 7b. The electrical press machine 9 includes an upper die 9a which is a driven object connected to the link mechanism 8. The electrical press machine 9 in this embodiment drives the upper die 9a (up and down movements) through the transmission mechanism 7 and the link mechanism 8 to press a metal sheet (not shown) placed between the upper die 9a and a lower die (not shown) when the motor 6 is activated (when the main gear 7b rotates in the direction indicated by an arrow A).

The position detection unit 10 is implemented by a rotary encoder or the like that detects the rotation angle Px of the main gear 7b (which corresponds to the position of the motor 6) as position information relating to the position of the motor. The first memory 11 stores a position control gain Gx, a proportional gain Gy and an integral gain Gz that are set for the upper die 9a. As will be detailed later, the position control gain Gx is used for generating a speed command value Fx for the main gear 7b, which is a third speed command value relating to the motor. The proportional gain Gy and the integral gain Gz are used for generating a torque command value (a current command value) Tx for the motor 6, which corresponds to the speed command value Fx for the main gear 7b.

The motor controller 12 is implemented by a processor including input and output ports, a serial communication circuit, an analog-digital converter, a counter, and other components. The motor controller 12 performs feedback control for the motor 6 in order to cause the motor 6 to drive the upper die 9a. For that purpose, the motor controller 12 includes a speed detection unit 21, a position control unit 22, a speed control unit 23, a voltage command value generating unit 24 and a PWM signal generating unit 25.

The speed detection unit 21 takes an input of the rotation angle Px of the main gear 7b from the position detection unit 10, detects the rotation speed ωx of the main gear 7b that corresponds to the speed of the motor 6 by first-order differentiation of the rotation angle Px with respect to time, and outputs the rotation speed ωx to the speed control unit 23.

The position control unit 22 uses the rotation angle Px and a position command value θx for the main gear 7b, which is a position command value relating to the position of the motor, to control the position of the main gear 7b. For that purpose, the position control unit 22 includes a subtracter 22a and a position control gain multiplier 22b.

The subtracter 22a includes a positive input terminal, a negative input terminal, and an output terminal. A position command value θx is input to the positive input terminal from the host controller 14. The rotation angle Px of the main gear 7b is input to the negative input terminal from the position detection unit 10. The output terminal outputs a position error Δx between the position command value θx and the rotation angle Px to the position control gain multiplier 22b.

The position control gain multiplier 22b takes an input of a position error Δx from the subtracter 22a and obtains a position control gain Gx from the first memory 11. The position control gain multiplier 22b generates a speed command value Fx that is equal to the product of the position control gain Gx and the position error Δx, and outputs the generated speed command value Fx to the speed control unit 23.

The speed control unit 23 uses a speed command value Fx and a rotation speed ωx to control the speed of the main gear 7b. For that purpose, the speed control unit 23 includes a subtracter 23a, a proportional gain multiplier 23b, an integrator 23c, an integral gain multiplier 23d, and an adder 23e.

The subtracter 23a includes a positive input terminal, a negative input terminal, and an output terminal. A speed command value Fx is input to the positive input terminal from the position control gain multiplier 22b. A rotation speed ωx is input to the negative input terminal from the speed detection unit 21. The output terminal outputs a speed error Δω between the speed command value Fx and the rotation speed ωx to the proportional gain multiplier 23b and the integrator 23c.

The proportional gain multiplier 23b takes an input of a speed error Δω from the subtracter 23c and obtains a proportional gain Gy from the first memory 11. The proportional gain multiplier 23b then generates a product Gy×Δω, which is the product of the proportional gain Gy and the speed error Δω, and outputs the generated product Gy×Δω to the adder 23e.

The integrator 23c takes an input of a speed error Δω from the subtracter 23a, performs first-order integration of the input speed error Δω, and outputs the first-order integral of the speed error Δω(the first-order integral speed error SΔω) to the integral gain multiplier 23d.

The integral gain multiplier 23d takes an input of the first-order integral speed error SΔω from the multiplier 23c and obtains an integral gain Gz from the first memory 11. The integral gain multiplier 23d then generates a product Gz×SΔω which is the product of the integral gain Gz and the first-order integral speed error SΔω, and outputs the generated product Gz×SΔω to the adder 23e.

The adder 23e includes a first positive input terminal, a second positive input terminal and an output port. The product Gy×Δω is input to the first positive input terminal from the proportional gain multiplier 23b. The product Gz×SΔω is input to the second positive input terminal from the integral gain multiplier 23d. The output port outputs a torque command value Tx that is equal to the sum of the product Gy×Δω and the product Gz×SΔω to the voltage command value generating unit 24.

The voltage command value generating unit 24 takes an input of a torque command value Tx from the output port of the adder 23e and converts the input torque command value Tx to a current command value Ix for the motor 6. The voltage command value generating unit 24 also takes inputs of two phases, namely the U-phase current and the V-phase current among the three phases, namely U-phase current, the V-phase current, and W-phase current flowing through the motor 6 from the current sensing units 5U and 5V, and obtains a value I of the current flowing through the motor 6 on the basis of the input U-phase current and V-phase current. The voltage command value generating unit 24 then generates a voltage command value Vx for the motor 6 on the basis of a current error ΔI between the current command value Ix and the value I of the current.

The PWM signal generating unit 25 takes an input of a voltage command value Vx for the motor 6 from the voltage command value generating unit 24 and converts the input voltage command value Vx to a PWM signal $V_{PWM}$. The PWM signal generating unit 25 then outputs the converted PWM signal $V_{PWM}$ to the inverter 4.

The second memory 13 stores a table indicating the relationship among four parameters: the rotation angle of the main gear 7b, a gain multiplier αx, a minimum speed command value Fminx for the main gear 7b, and a maximum speed command value Fmaxx for the main gear 7b. The gain multiplier Δx is a gain-related value used for setting a position control gain Gx. The minimum speed command value Fminx is a first set value which is set as the lower limit of the speed command value Fx. The maximum speed command value Fmaxx is a second set value which is set as the upper limit of the speed command value Fx and is greater than the first set value.

FIG. 2 illustrates an example of the parameter table used by the host controller illustrated in FIG. 1. In FIG. 2, the rotation angle PN of the main gear 7b (N is an integer ranging from 1 to 9) is associated with the gain multiplier ΔN, the minimum speed command value FminN, and the maximum speed command value FmaxN and may take a value of 40(N−1)°, for example. In this embodiment, the second memory 13 also stores a constant gain G, which is a gain-related value set for the upper die 9a, irrespective of the rotation angle Px.

The host controller 14 is implemented by a CNC (computerized numerical controller) or the like. In this embodiment, the host controller 14 inputs a position command value θx into the motor controller 12 in order to control the motor controller 12 and sets a position control gain Gx. For that purpose, the host controller 14 includes a position command value generating unit 14a, a reference value generating unit 14b, a speed command value generating unit 14c, and a position control gain generating unit 14d. In this embodiment, the host controller 14 performs an override to change the rotation speed ωw of the main gear 7b on the basis of an override value β (for example, 0.5), which is a set override value, in order to perform operation check and adjustment before the upper die 9a driven by the motor 6 performs a predetermined operation, as will be described later.

The position command value generating unit 14a takes an input of an override value β from the operation unit 15 and analyzes data in a press program 16 that relates to a position command value for the main gear 7b taken when the override value β is 1. The press program 16 is a program for press by the electrical press machine 9.

The position command value generating unit 14a obtains a position command value θx for the main gear 7b on the basis of the analyzed data on the position command value and the override value β and outputs the obtained position command value θx to the positive input terminal of the subtracter 22a.

For example, when the override value β is 1, the position command value generating unit 14a outputs corresponding one of position command values θ1, . . . , θm, θ1, . . . , θm to the motor controller 12 at each regular time interval during a predetermined period of time (for example, 1 second). When a speed command value Fx generated by the speed command value generating unit 14c, as will be described later, is greater than or equal to the minimum speed command value Fminx and smaller than or equal to the maximum speed command value Fmaxx, the position command value generating unit 14a outputs corresponding one of position command values θ½, θ1, . . . , θm/2, θm to the motor controller 12 at each regular time interval during a predetermined period of time (for example, 1 second) in response to an input of an override value β of 0.5 from the operation unit 15.

Assume that a first speed command value included in the press program 16, which relates to the speed of the motor when the override value β is 1 conforms to a speed command value Fbase for the main gear 7b. The reference value generating unit 14b analyses data on the speed command value Fbase for the main gear 7b to generate a reference value S that is equal to the speed command value Fbase.

The speed command value generating unit 14c obtains the reference value S and the override value β and generates a speed command value Fx, which is the speed command value taken when the override value β is a set value (for example, 0.5) on the basis of the reference value S and the override value β.

For that purpose, the speed command value generating unit 14c takes an input of the reference value S from the reference value generating unit 14b and an input of the override value β from the operation unit 15. The speed command value generating unit 14c then generates a speed command value Fx that is equal to the product of the reference value S and the override value β and outputs the generated speed command value Fx to the position control gain generating unit 14d.

The position control gain generating unit 14d takes an input of a rotation angle Px from the position detection unit 10, an input of the reference value S from the reference value generating unit 14b, and an input of a speed command value Fx from the speed command value generating unit 14c and obtains, from the second memory 13, a gain G and a gain multiplier Δx corresponding to the rotation angle Px.

The position control gain generating unit 14d then generates a position control gain Gx on the basis of the ratio γ of the speed command value Fx to the reference value S, the gain multiplier αx, and the gain G. Specifically, the position control gain generating unit 14d generates a position control gain Gx that is equal to the product of the gain multiplier αx, the gain G, and the ratio γ (γ×αx×G). In this way, the position control gain generating unit 14d generates a position control gain Gx according to the ratio γ (in this case, the ratio γ is equal to the override value β).

The position control gain generating unit 14d then outputs the generated position control gain Gx to the first memory 11 to rewrite the position control gain Gx stored in the first memory 11 with the position control gain Gx that the position control gain generating unit 14d has newly generated.

Thus, when an override is made by the host controller 14, the position control gain multiplier 22b uses the position control gain Gx that is newly generated by the position control gain generating unit 14d to generate a speed command value Fx.

The operation unit 15 inputs the override value β to the position command value generating unit 14a and the speed command value generating unit 14c when the speed of the motor 6 is reduced in order to perform operation check and adjustment of the upper die 9a driven by the motor 6 before the upper die 9a moves back and forth in the direction indicated by an arrow B.

Figure 3:
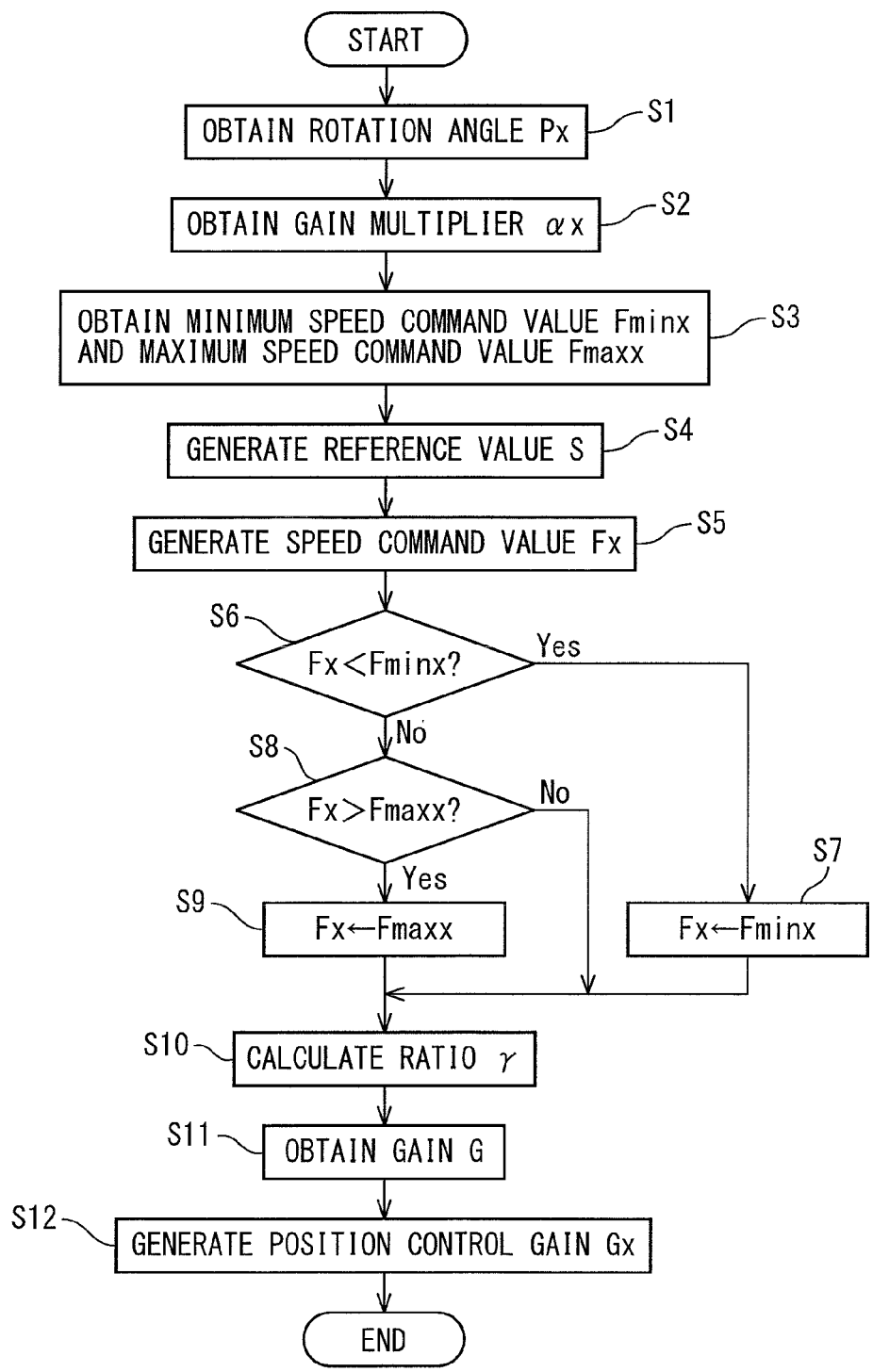
FIG. 3 is a flowchart of an operation of the host controller illustrated in FIG. 1.

FIG. 3 is a flowchart of an operation of the host controller illustrated in FIG. 1. The process of the flowchart is executed during an override by the host controller 14 and is controlled by a process program executed on the host controller 14.

First, the position control gain generating unit 14d obtains a rotation angle Px (step S1). Then, the position control gain generating unit 14d obtains a gain multiplier Δx on the basis of the obtained rotation angle Px (step S2).

When the rotation angle Px is equal to a rotation angle PN (for example, rotation angle P1), the position control gain generating unit 14d obtains a gain multiplier ΔN (for example, gain multiplier α1 when the rotation angle Px is rotation angle P1) from the second memory 13 and sets the obtained gain multiplier ΔN as the gain multiplier αx.

On the other hand, when the rotation angle Px is not equal to the rotation angle PN, the position control gain generating unit 14d obtains gain multipliers αm and αn that correspond to the angles Pm and Pn preceding and succeeding the rotation angle Px (for example, rotation angles P1 and P2) from the second memory 13 and calculates a gain multiplier Δx on the basis of the following formula:

$$\alpha x = (Px - Pm) \times (\alpha n - \alpha m)/(Pn - Pm) + \alpha m.$$

Then, the position control gain generating unit 14d obtains the minimum speed command value Fminx and the maximum speed command value Fmaxx (step S3).

When the minimum speed command value Fminx and the maximum speed command value Fmaxx are equal to a minimum speed command value FminN and a maximum speed command value FmaxN, respectively (for example, minimum speed command value Fmin1 and a maximum speed command value Fmax1), the position control gain generating unit 14d obtains the minimum speed command value FminN and the maximum speed command value FmaxN (for example, minimum speed command value Fmin1 and maximum speed command value Fmax1 when the rotation angle Px is rotation angle P1) from the second memory 13 and sets the obtained minimum speed command value FminN and maximum speed command value FmaxN as the minimum speed command value Fminx and the maximum speed command value Fmaxx, respectively.

On the other hand, when the minimum speed command value Fminx and the maximum speed command value Fmaxx are not equal to the minimum speed command value FminN and the maximum speed command value FmaxN, respectively, the position control gain generating unit 14d obtains the minimum speed command values Fminm and Fminn corresponding to the angles Pm and Pn preceding and succeeding the rotation angle Px (for example, rotation angles P1 and P2) from the second memory 13 and calculates a minimum speed command value Fminx on the basis of the following formula:

$$Fminx = (Px - Pm) \times (Fminn - Fminm)/(Pn - Pm) + Fminm.$$

In this case, the position control gain generating unit 14d obtains the maximum speed command values Fmaxm and Fmaxn corresponding to the angles Pm and Pn preceding and succeeding the rotation angle Px (for example, rotation angles P1 and P2) from the second memory 13 and calculates a maximum speed command value Fmaxm on the basis of the following formula:

$$Fmaxx = (Px - Pm) \times (Fmaxn - Fmaxm)/(Pn - Pm) + Fmaxm.$$

Then, the reference value generating unit 14b generates a reference value S and outputs the generated reference value S to the speed command value generating unit 14c and the position control gain generating unit 14d (step S4), and the speed command value generating unit 14c generates a speed command value Fx and outputs the generated speed command value Fx to the position control gain generating unit 14d (step S5).

Then, the position control gain generating unit 14d determines whether or not the speed command value Fx is smaller than the minimum speed command value Fminx (step S6). When the speed command value Fx is smaller than the minimum speed command value Fminx, the position control gain generating unit 14d sets the speed command value Fx to a value equal to the minimum speed command value Fminx (step S7).

On the other hand, when the speed command value Fx is greater than or equal to the minimum speed command value Fminx, the position control gain generating unit 14d determines whether or not the speed command value Fx is greater than the maximum speed command value Fmaxx (step S8). When the speed command value Fx is greater than the maximum speed command value Fmaxx, the position control gain generating unit 14d sets the speed command value Fx to a value equal to the maximum speed command value Fmaxx (step S9).

When the position control gain generating unit 14d determines at step S8 that the speed command value Fx is smaller than or equal to the maximum speed command value Fmaxx, or after setting the speed command value Fx to a value equal to the minimum speed command value Fminx at step S7, or after the position control gain generating unit 14d has set the speed command value Fx to a value equal to the maximum speed command value Fmaxx at step S9, the position control gain generating unit 14d calculates a ratio γ on the basis of the following formula (step S10):

$$\gamma = Fx/S.$$

Then, the position control gain generating unit 14d obtains the gain G from the second memory 13 (step S11). The position control gain generating unit 14d then generates a position control gain Gx expressed by the following formula:

$$Gx = \gamma \times \alpha \times G.$$

Then, the position control gain generating unit 14d rewrites the position control gain Gx stored in the first memory 11 with the position control gain Gx obtained at step S11 (step S12), and then the process flow is terminated.

According to this embodiment, the position control gain Gx is changed according to a change of the ratio γ which is equal to the override value β, i.e., the speed command value Fx, thereby keeping the position error Δx constant, irrespective of the change in the override value β. Thus, the motor controller 12 can be controlled so that the motion trajectory of the upper die 9a is kept constant irrespective of a change in the speed command value Fx, i.e., a change in the override value β.

FIG. 4 illustrates a variation of the parameter table used by the host controller illustrated in FIG. 1. In FIG. 4, the rotation angle PN of the main gear 7b (N is an integer ranging from 1 to 9) is associated with a gain GN which is a gain-related value equal to the product of a gain multiplier ΔN and a gain G, a minimum speed command value FminN, and a maximum speed command value FmaxN. The rotation angle PN may take a value of 40(N−1)°, for example. In this case, the gain G is not stored in the second memory 13.

Second Embodiment

FIG. 5 is a block diagram of a system including a host controller of a second embodiment of the present invention. In the system illustrated in FIG. 5, a position detection unit 10' which is implemented by a linear encoder or the like that detects the position of an upper die 9a as position information relating to the position of the motor is used instead of the position detection unit 10. In addition, the host controller 14 is replaced with a host controller 14' which includes, instead of the position control gain generating unit 14d, a position control gain generating unit 14d' to which the position Z of the upper die 9a is input from the position detection unit 10'.

In this embodiment, a press program 16' includes data on a position command value for the upper die 9a taken when the override value β is 1 and data on a speed command value Fbase' for the upper die 9a, which is a first speed command value relating to the speed of the motor taken when the override value β is 1.

Accordingly, the position command value generating unit 14a' obtains a position command value Zx for the upper die 9a on the basis of the analyzed data on the position command value and the override value β and outputs the obtained position command value Zx to the positive input terminal of the subtracter 22a.

The reference value generating unit 14b' analyzes data on the speed command value Fbase' included in the press program 16' to generate a reference value S' that is equal to the speed command value Fbase'.

Further, the speed command value generating unit 14c' obtains the reference value S' and the override value β, and generates a speed command value Fx' for the upper die 9a as a third speed command value relating to the speed of the motor which is a speed command value taken when the override value β is a set value (for example, 0.5) on the basis of the reference value S' and the override value β.

According to this embodiment, a position control gain Gx is changed in accordance with a change of a speed command value Fx' to keep a position error Δx' between a position command value Zx for the upper die 9a and the position Z of the upper die 9a constant, irrespective of a change in the override value β. Thus, the motor controller 12 can be controlled so that the motion trajectory of the upper die 9a is kept constant irrespective of a change in the speed command value Fx', i.e., a change in the override value β.

Third Embodiment

FIG. 6 is a block diagram of a system including a host controller of a third embodiment of the present invention. In the system illustrated in FIG. 6, a position detection unit 10'' implemented by a rotary encoder or the like which detects the position of a motor 6 as position information relating to the position of the motor is used instead of the position detection unit 10. In addition, the host controller 14 is replaced with a host controller 14'' that includes, instead of the position control gain generating unit 14d, a position control gain generating unit 14d'' to which the rotation angle Px'' of the motor 6 is input from the position detection unit 10''.

In the third embodiment, a press program 16'' includes data on a position command value for the motor 6 taken when the override value f is 1 and data on a speed command value Fbase'' for the motor 6, which is a first speed command value relating to the speed of the motor taken when the override value β is 1.

Accordingly, the position command value generating unit 14a'' obtains a position command value θx'' for the motor 6 on the basis of the data on the analyzed position command value and the override value β, and outputs the obtained position command value θx'' to the positive input terminal of the subtracter 22a.

The reference value generating unit 14b'' analyzes data on the speed command value Fbase'' included in the press program 16'' to generate a reference value S'' that is equal to the speed command value Fbase''.

Further, the speed command value generating unit 14c'' obtains the reference value S'' and the override value β, and generates a speed command value Fx'' for the motor 6 as a third speed command value relating to the speed of the motor which is a speed command value taken when the override value β is a set value (for example, 0.5) on the basis of the reference value S'' and the override value β.

According to this embodiment, a position control gain Gx is changed in accordance with a change of a speed command value Fx'' to keep a position error Δx'' between a position command value θx'' for the motor 6 and the rotation angle Px'' of the motor constant, irrespective of a change in the override value β. Thus, the motor controller 12 can be controlled so that the motion trajectory of the upper die 9a is kept constant irrespective of a change in the speed command value Fx'' for the motor 6, i.e., a change in the override value β.

The present invention is not limited to the embodiments described above but various modifications and variations are possible. For example, while the embodiments have been described above in the context of using the host controller according to the present invention for driving the upper die of an electrical press machine, the host controller according to the present invention may be used for purposes other than driving the upper die of an electrical press machine.

While the embodiments have been described above in the context where the gain multiplier, the minimum speed command value, and the maximum speed command value are set for each rotation angle of the main gear, the host controller according to the present invention is also applicable to a case where the gain multiplier, the minimum speed command value, and the maximum speed command value are constant irrespective of the rotation angle of the main gear (for example, when a driven object moves linearly). In that case, a gain set for the driven object is used as the gain-related value.

While the embodiments have been descried above in the context where the reference value is set to the value equal to the speed command value taken when the override value is 1, the reference value may be set to the value equal to a second speed command value set on the basis of the speed command value taken when the override value is 1 (for example, a value obtained by multiplying the speed command value, when the override value is 1, by a constant (for example, 0.9)).

What is claimed is:

1. A host controller outputting a position command value relating to a position of a motor to a motor controller controlling the motor in order to control the motor controller, the host controller comprising:
    a reference value generating unit analyzing data in a program that concerns a first speed command value relating to a speed of the motor taken when an override value is 1 to generate a reference value that is equal to the first speed command value or a second speed command value set based on the first speed command value;
    a speed command value generating unit obtaining the first speed command value and a set override value and generating, based on the first speed command value and the set override value, a third speed command value relating to a speed of the motor when the override value is the set value; and
    a position control gain generating unit taking an input of the reference value from the reference value generating unit and an input of the third speed command value from the speed command value generating unit, obtaining a gain-related value relating to a gain set in accordance with a driven object driven by the motor, generating, based on a ratio of the third speed command value to the reference value and the gain-related value, a position control gain used by the motor controller for generating the third speed command value, and outputting the generated position control gain.

2. The host controller according to claim 1, wherein the position control gain generating unit takes an input of position information relating to a position of the motor and generates the position control gain based on the position information.

3. The host controller according to claim 1, wherein
    when the third speed command value is smaller than a first set value set as a lower limit of the speed command value, the position control gain generating unit sets the third speed command value to the first set value, and
    when the third speed command value is greater than a second set value set as an upper limit of the speed command value, the position control gain generating unit sets the third speed command value to the second set value, the second set value being greater than the first set value.

4. The host controller according to claim 2, wherein
    when the third speed command value is smaller than a first set value set as a lower limit of the speed command value, the position control gain generating unit sets the third speed command value to the first set value, and
    when the third speed command value is greater than a second set value set as an upper limit of the speed command value, the position control gain generating unit sets the third speed command value to the second set value, the second set value being greater than the first set value.

* * * * *